Aug. 16, 1966    R. HÜBNER    3,266,293

PORTABLE GAS ANALYZER

Filed Dec. 7, 1964    2 Sheets-Sheet 1

Rolf Hübner
INVENTOR.

BY
Karl G. Ross

AGENT

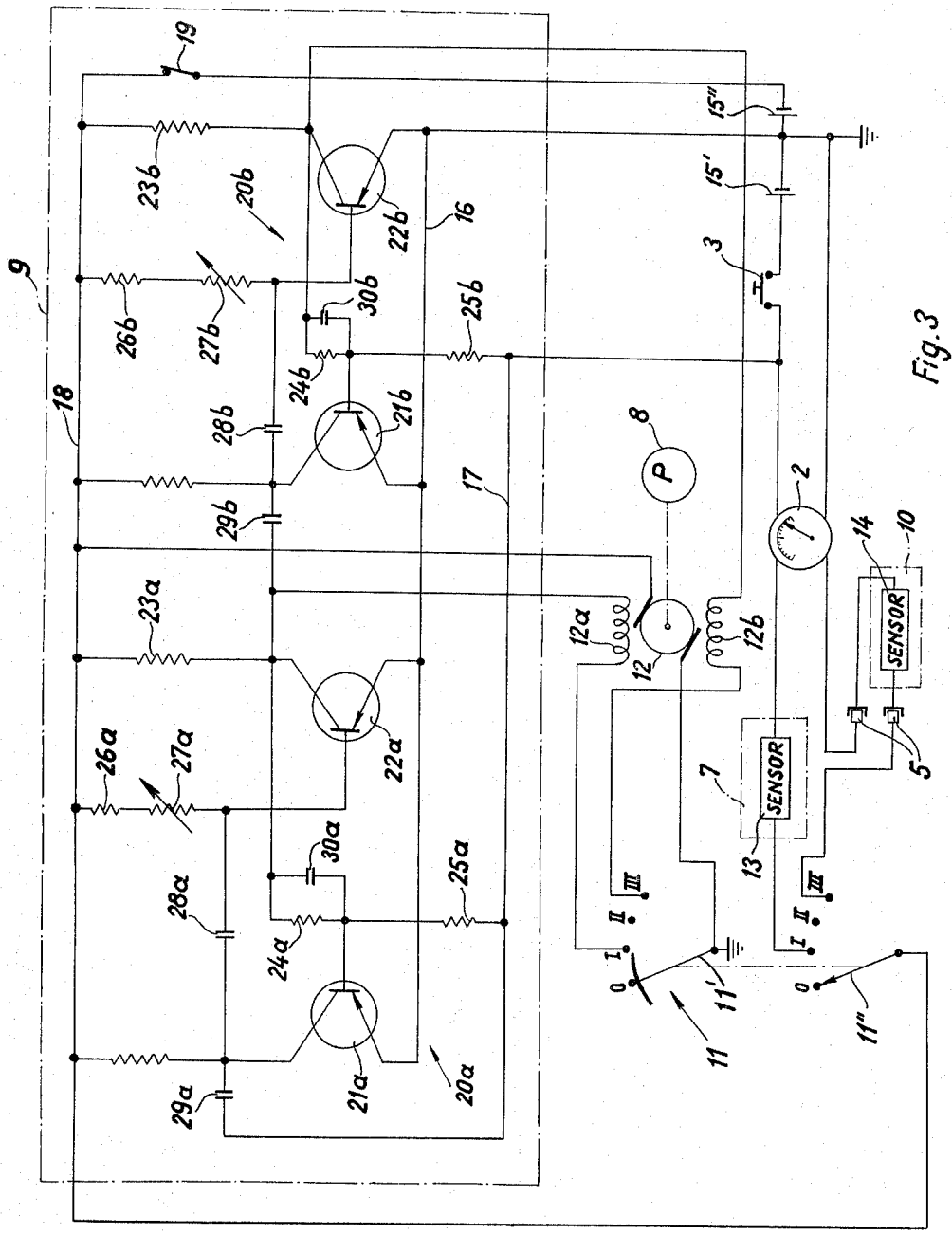

United States Patent Office 3,266,293
Patented August 16, 1966

3,266,293
PORTABLE GAS ANALYZER
Rolf Hübner, Gabelsbergerstr. 31, Dortmund, Germany
Filed Dec. 7, 1964, Ser. No. 416,655
Claims priority, application Germany, Dec. 5, 1963,
H 51,047
10 Claims. (Cl. 73—23)

My present invention relates to an instrument for the analysis of gas samples to measure the concentration of certain constituents in subterranean atmospheres and similar environments.

In the analysis of such gaseous constituents, different testing methods have been found suitable for different components. In the case of methane, for example, it is customary to measure thermal conductivity in order to determine the presence of a quantity of that compound in an atmospheric sample, whereas with carbon monoxide and carbon dioxide it is more advantageous to test the electrical conductivity of a gas stream. In the first instance, therefore, it is convenient to admit a predetermined quantity of the gas into a measuring chamber equipped with thermoelectric sensing means; in the second case, on the other hand, a cell adapted for the measurement of electrical resistance (or sometimes capacitance) is usually inserted into a narrow tubular probe to serve as the sensing device. In view of the limited supply of electric or other energy available in mines and at similar sites, the feeding of gas to the sensing devices of such instruments has hitherto largely been carried out by hand.

The general object of my present invention is to provide, in an instrument for the purpose described, automatic means for aspirating a predetermined quantity of ambient gas on which the desired tests are to be performed, for the purpose of introducing a measured amount thereof into a test chamber and/or limiting the amount of energy to be drawn during each test from an exhaustible power supply, such as an electric battery.

A more particular object of this invention is to provide, in such instrument, means for selectively carrying out different types of gas-analysis tests calling for different quantities of gas to be sampled.

An instrument according to my present invention, designed to satisfy the aforestated requirements, comprises a common housing (not necessarily in one piece) which accommodates one or more of the aforementioned sensing devices in a gas passage, a suction pump or equipment forced-circulation means for aspirating ambient gas through this passage, a timer-controlled drive for the pump and a common indicator for all the sensing devices. The timer is started, according to a more specific feature of the invention, upon the operation of a manual switch or other actuating means which completes an energizing circuit for the pump drive and for the sensing and indicating devices.

For use as a portable gas analyzer in mine shafts and other underground locations, an instrument according to my invention will usually be equipped with an electric battery serving as a compact unitary power source. Reference is made in this connection to my copending U.S. application Serial No. 412,120, filed November 18, 1964, in which I have disclosed means for charging and recharging a portable instrument of this character.

My invention will be described in greater detail in reference to the accompanying drawing in which:

FIG. 3 is a circuit diagram of the instrument shown in FIGS. 1 and 2.

Figure 1:
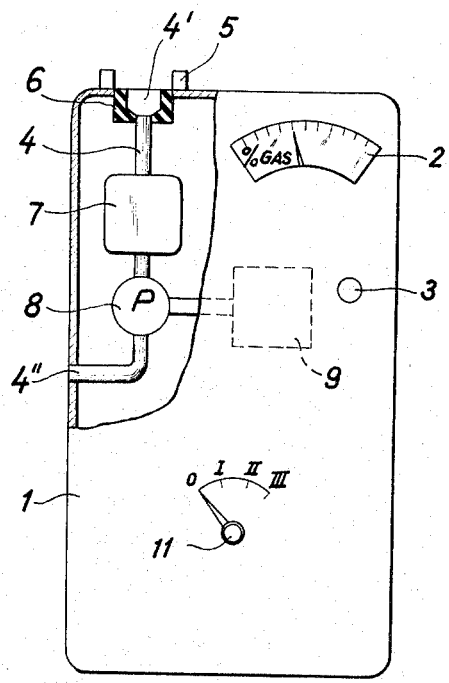
FIG. 1 is a front view (parts broken away) of a portable gas analyzer according to the invention.
Figure 2:
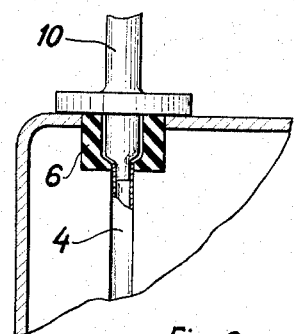
FIG. 2 is a partial view, in sectional elevation, of the instrument of FIG. 1 with a measuring probe detachably fitted thereon.

The instrument illustrated in FIGS. 1 and 2 comprises a housing 1 with a window for the reading of a meter 2 suitably calibrated to indicate the percentages of certain constituents (e.g. $CO$, $CO_2$, $CH_4$) in the atmosphere to be tested. A pushbutton 3 on housing 1 serves as a circuit closer for the energization of the meter 2 and several sensors, not shown in FIGS. 1 and 2, respectively lodged in a measuring chamber 7 (FIG. 1) and in a tubular probe 10 which is receivable in a socket 4' at the inlet of a gas passage 4. Beyond chamber 7, which forms part of this gas passage, there is disposed a pump 8 electrically driven under the control of a timing circuit 9, as more fully described hereinafter with reference to FIG. 3. The gases aspirated at inlet 4', either directly or by way of probe 10, are discharged at an outlet 4''. Inlet 4' is provided with a gasket 6, designed to insure airtight fitting of the inserted probe 10, and with pins 5 serving as locators and electrical connectors to the measuring cell inside the probe. Also shown on housing 1 is a selector switch 11 provided for the purpose of adjusting the timer 9 to different operating conditions, e.g. for the testing of methane by a sensor in chamber 7 or the testing of $CO/CO_2$ by a sensor in probe 10.

Reference will now be made to FIG. 3 for a description of the timing circuit 9 and associated elements present in housing 1, including the indicator 2, the starting switch 3, the pump 8 and the selector switch 11 described above. Pump 8 is coupled with a drive motor 12 having two windings 12a, 12b connected to respective bank contacts associated with a wiper 11' on one level of switch 11. Corresponding bank contacts on another level of the switch, engageable by a wiper 11'', are respectively connected to a sensor 13 in chamber 7 and to a sensor 14 in probe 10. The output leads of both sensors 13, 14 extend to the meter 2, the pins 5 being included in the connections of sensor 14.

A source of power for the pump motor 12, the measuring circuits 2, 13, 14 and the timer 9 has been indicated diagrammatically as a battery of two or more cells 15', 15'' with a grounded central terminal connected to a bus bar 16, a positive terminal connected to a bus bar 17 through the normally open pushbutton 3, and a negative terminal connected to a bus bar 18 through a switch 19 which is closed whenever the instrument is ready for operation. The timer comprises a pair of solid-state monostable multivibrator stages 20a, 20b each including a normally nonconductive transistor 21a or 21b and a normally conductive transistor 22a or 22b. The collector of transistor 22a is connected to negative bus bar 18 through a resistor 23a which forms part of a voltage divider bridging the bus bars 17 and 18, this voltage divider further including a resistor 24a between the collector of transistor 22a and the base of transistor 21a as well as a resistor 25a between this base and bus bar 17. In analogous manner, resistors 23b, 24b and 25b are connected to corresponding electrodes of multivibrator stage 20b. The base of transistor 22a is connected to bus bar 18 via a fixed resistor 26a and an adjustable calibrating resistor 27a, the connection between bus bar 18 and the base of transistor 22b similarly including a fixed resistor 26b and an adjustable resistor 27b. The collector of transistor 21a is connected to the base of transistor 22a through a capacitor 28a and to positive bus bar 17 through a capacitor 29a; similarly, the collector of transistor 21b is connected to the base of transistor 22b through a capacitor 28b and to the collector of transistor 22a in the preceding stage via a capacitor 29b. Resistors 24a and 24b are shunted by respective capacitors 30a, 30b. All the emitters are grounded at bus bar 16.

With switch 11 in its position I, wiper 11' connects field winding 12a of motor 12 across the normally conductive transistor 22a whereby this winding is virtually short-circuited. In switch position III, wiper 11' similarly connects field winding 12b of motor 12 across transistor 22b so that this winding, too, is ineffectual because of the short-circuiting transistor. Wiper 11", at the same time, connects either the sensor 13 (position I) or the sensor 14 (position III) to the meter 2.

When the operator manually closes the switch 3, but bar 17 is energized and meter 2 as well as sensor 13 or 14 are made operative. The application of positive voltage to bus bar 17 generates a positive pulse across condensers 29a and 28a in series to cut off the transistor 22a and to render the companion transistor 21a conductive through the application of a negative pulse to its base by way of condenser 30a. This removes the short circuit from winding 12a to drive the pump 8 if switch 11 is in position I. As soon as the negative pulse developed across condenser 30a has sufficiently decayed, i.e. after an interval determined by the magnitude of this condenser and other circuit parameters, multivibrator stage 20 reverts to its normal condition and the pump motor stops. Upon such reversion, a positive pulse from the collector of transistor 22a is transmitted via series condensers 29b and 28b to transistor 22b, thereby blocking the flow of current therethrough and initiating conductance in transistor 21b as described above with reference to transistors 21a and 22a. Stage 20b thus remains off-normal for an interval determined by the capacitance of condenser 30b and other circuit parameters of that stage, motor winding 12b being energized during this interval to drive the pump 8 if the switch 11 stands in its position III.

The operating intervals established by multivibrator stages 20a and 20b are of different duration and should be so chosen as to satisfy the requirement of the respective sensor 13 or 14; thus, the off-normal period of stage 20a may be relatively short, just sufficient to introduce a measured gas volume into chamber 7 after which the operator reads the meter 2 before releasing the pushbutton 3, whereas the corresponding period of stage 20b should be long enough to enable a reading of the meter during the flow of the gas through probe 10. Meter 2 could, of course, be provided with plural scales for different gases. The number of sensors selectively connectable to the meter could be increased, if desired; thus, in position II of switch 11 the two bank contacts associated with the wiper 11' are bridged by that wiper so that windings 12a and 12b are consecutively energized for an extended operating interval of pump 8, hence this switch position could be used for some other test with a different sensor or with one of the existing sensors under different operating conditions. Finally, if the second multivibrator stage 20b were omitted, air would be drawn continuously through probe 10 in switch position III as long as pushbutton 3 is held depressed, which may be desirable in some instances since it extends the time available for the reading of the indicator; in this case, however, there is no automatic shut-off of the current flow after a definite period so that an unexpectedly rapid depletion of the battery may result.

Modifications of the structure and circuitry described and illustrated are, of course, possible without departing from the spirit and scope of my invention as defined in the appended claims.

I claim:

1. An instrument for the analysis of atmospheric samples, comprising a housing provided with conduit means forming a passage for gas to be analyzed, sensor means for said gas in said passage, indicator means controlled by said sensor means on said housing, suction means in said housing for drawing ambient gas through said passage, drive means for said suction means in said housing, energizing means in said housing for said drive means, actuating means on said housing for rendering said energizing means effective to operate said drive means, and timer means in said housing controlled by said actuating means for deactivating said drive means at the end of a predetermined operating period.

2. An instrument as defined in claim 1 wherein said passage is a measuring chamber in said housing.

3. An instrument as defined in claim 1 wherein said conduit means includes a probe detachably mounted on said housing.

4. An instrument as defined in claim 1 wherein said sensor means and indicator means are provided with an operating circuit connectable to said energizing means by said actuating means.

5. An instrument as defined in claim 4 wherein said sensor means includes a plurality of sensing devices at different locations of said passage, said indicator means being common to all of said devices.

6. An instrument for the analysis of atmospheric samples, comprising a housing provided with conduit means forming a passage for gas to be analyzed, sensor means for said gas in said passage, indicator means controlled by said sensor means on said housing, suction means in said housing for drawing ambient gas through said passage, drive means for said suction means in said housing, an electric power source in said housing for said drive means, actuating means on said housing for rendering said power source effective to supply operating current to said sensor means, indicator means and drive means, and timer means in said housing controlled by said actuating means for deactivating said drive means at the end of a predetermined operating period.

7. An instrument as defined in claim 5 wherein said timer means comprises a solid-state monostable multivibrator.

8. An instrument for the analysis of atmospheric samples, comprising a housing provided with conduit means forming a passage for gas to be analyzed, sensor means for said gas in said passage, indicator means controlled by said sensor means on said housing, suction means in said housing for drawing ambient gas through said passage, drive means for said suction means in said housing, energizing means in said housing for said drive means, actuating means on said housing for rendering said energizing means effective to operate said drive means, adjustable timer means in said housing controlled by said actuating means for deactivating said drive means at the end of a predetermined operating period, and selector means on said housing for varying said operating period by adjusting said timer means.

9. An instrument for the analysis of atmospheric samples, comprising a housing provided with conduit means forming a passage for gas to be analyzed, sensor means for said gas in said passage, indicator means controlled by said sensor means on said housing, suction means in said housing for drawing ambient gas through said passage, drive means for said suction means in said housing, an electric power source in said housing for said drive means, actuating means on said housing for rendering said power source effective to supply operating current to said sensor means, indicator means and drive means, adjustable timer means in said housing controlled by said actuating means for deactivating said drive means at the end of a predetermined operating period, and selector means on said housing for varying said operating period by adjusting said timer means.

10. An instrument as defined in claim 9 wherein said timer means comprises a solid-state multistage multivibrator.

References Cited by the Examiner

UNITED STATES PATENTS

| | | | |
|---|---|---|---|
| 2,353,218 | 7/1944 | Burnham et al. | 328—131 |
| 2,720,108 | 10/1955 | Johnson | 73—27 |
| 2,786,350 | 3/1957 | Johnson | 73—27 |

OTHER REFERENCES

M.S.A. Carbon Monoxide Indicator, 4 pp., received in Patent Office Jan. 20, 1936.

RICHARD C. QUEISSER, *Primary Examiner.*

J. FISHER, *Assistant Examiner.*